US012130086B1

(12) United States Patent
Nguyen et al.

(10) Patent No.: US 12,130,086 B1
(45) Date of Patent: Oct. 29, 2024

(54) THERMAL STORAGE BATTERIES AND THERMAL STORAGE BATTERY SYSTEMS FOR DRYING AGRICULTURAL AND FOOD PRODUCTS

(71) Applicant: Alterno Pte. Ltd., Singapore (SG)

(72) Inventors: Nam Quoc Nguyen, Hanoi (VN); Hai Viet Ho, Ho Chi Minh City (VN); Hung Van Quach, Binh Phuoc (VN); Phong Tue Mai, Lam Dong (VN); Luan The Nguyen, Ho Chi Minh City (VN)

(73) Assignee: Alterno Pte. Ltd., Singapore (SG)

( * ) Notice: Subject to any disclaimer, the term of this patent is extended or adjusted under 35 U.S.C. 154(b) by 0 days.

(21) Appl. No.: 18/623,773

(22) Filed: Apr. 1, 2024

(51) Int. Cl.
  *F26B 23/00* (2006.01)
  *F28D 20/00* (2006.01)
  *F28D 20/02* (2006.01)

(52) U.S. Cl.
  CPC ........ *F28D 20/0056* (2013.01); *F26B 23/001* (2013.01); *F28D 20/028* (2013.01); *F28D 2020/0069* (2013.01); *Y02E 60/14* (2013.01)

(58) Field of Classification Search
  CPC ... Y02E 60/14; F28D 20/0056; F24H 7/0002; F24H 7/002; F26B 23/001
  See application file for complete search history.

(56) References Cited

U.S. PATENT DOCUMENTS 1,069,376 A * 8/1913 Bell .................. F24C 15/34
                                       219/400
3,381,113 A * 4/1968 Jacques ............... F24H 7/0433
                                       501/141

(Continued)

FOREIGN PATENT DOCUMENTS

| CN | 102322759 A | * | 1/2012 |  |
| CN | 114777105 A | * | 7/2022 | ............... F22G 3/00 |
| CN | 115823922 A | * | 3/2023 |  |

OTHER PUBLICATIONS abc.net.au [online], "A 'graphite battery' in Wodonga will be Australia's first commercial thermal energy storage," Aug. 3, 2022, retrieved on Apr. 3, 2024, retrieved from URL<https://www.abc.net.au/news/2022-08-04/graphite-battery-will-be-first-commercial-thermal-energy-storage/101295350>, 5 pages.

(Continued)

*Primary Examiner* — Eric S Ruppert
(74) *Attorney, Agent, or Firm* — Fish & Richardson P.C.; Kim Thien Bui

(57) ABSTRACT

A thermal storage battery is described. The thermal storage battery includes a battery core including a battery core shell made of stainless steel and a thermal storage material mixture included in the battery core shell, the thermal storage material mixture including a mixture of sand and graphite; a plurality of heating elements placed in the battery core, in which each heating element is surrounded by a respective protective tube; a plurality of wall thermal insulation layers, a lid thermal insulation layer, and a bottom thermal insulation layer that enclose the battery core; and at least one heat extraction pipe configured to collect heat from the battery core. The battery core, the plurality of heating elements, the plurality of wall thermal insulation layers, the lid thermal insulation layer, the bottom thermal insulation layer, and the at least one heating collection pipe are encased in a steel outer frame.

20 Claims, 11 Drawing Sheets

(56) References Cited

U.S. PATENT DOCUMENTS

| | | | | |
|---|---|---|---|---|
| 3,569,669 | A | * | 3/1971 | March ................. B63C 11/28 165/104.31 |
| 4,973,777 | A | * | 11/1990 | Alagy ................. B01J 19/2425 585/539 |
| 9,752,787 | B1 | * | 9/2017 | Piner ................. F17D 1/084 |
| 2022/0146205 | A1 | | 5/2022 | Eronen et al. |
| 2022/0412228 | A1 | | 12/2022 | Ponec et al. |

OTHER PUBLICATIONS ase.mit.edu [online], "Thermal Energy Grid Storage (TEGS) Concept," Nov. 7, 2021, retrieved on Apr. 3, 2024, retrieved from URL<https://ase.mit.edu/projects/thermal-energy-grid-storage-tegs/>, 3 pages.

BBC.com [online], "How a sand battery could transform clean energy," Nov. 3, 2022, retrieved on Apr. 3, 2024, retrieved from URL<https://www.bbc.com/future/article/20221102-how-a-sand-battery-could-transform-clean-energy>, 9 pages.

* cited by examiner

THERMAL STORAGE BATTERIES AND THERMAL STORAGE BATTERY SYSTEMS FOR DRYING AGRICULTURAL AND FOOD PRODUCTS

CROSS REFERENCE TO RELATED APPLICATION

This application claims priority to Vietnamese Patent Application No. 1-2023-05430, filed on Aug. 15, 2023, the entire contents of which is hereby incorporated by reference in its entirety.

TECHNICAL FIELD

This specification generally relates to thermal storage batteries and thermal storage battery systems for storing and using thermal energy generated from renewable energy sources. More specifically, the specification relates to thermal storage batteries and thermal storage battery systems for drying agricultural and food products.

BACKGROUND

Numerous essential agricultural products, serving as primary food sources for billions of people, undergo a series of drying procedures before they are packaged, stored, purchased, exported, or consumed. Drying these products-such as rice, coffee, and tea—involves a substantial amount of energy with low efficiency.

Various methods exist for drying these products, each with differing costs, energy consumption levels, and complexities. The most traditional approach is sun drying, which offers the advantage of being simple and cost-effective. However, it relies entirely on weather conditions, sometimes taking several days for certain agricultural products and foods. Sun drying is unsuitable for producing goods that require high capacity and consistent drying quality.

In addition to sun drying, heat dryers are widely utilized. The operational principle of these dryers is relatively straightforward: the product to be dried is placed in a drying chamber, and hot air is circulated to evaporate the water, reducing it to the desired level. Dryers enable adjustment and assurance of the finished product's moisture content, offering higher productivity compared to sun drying and eliminating dependence on weather conditions. However, investing in dryers entails higher initial and operational costs. Common fuel sources for dryers include wood, oil, coal, and electricity, although traditional fuels are dwindling and have adverse environmental impacts.

With the advancement of renewable energy, solar and wind power can be harnessed for the drying process. Renewable energy sources offer significant environmental benefits by avoiding $CO_2$ emissions, thus mitigating climate change. Nonetheless, a limitation of this approach is its dependency on sunlight and wind availability, necessitating energy storage solutions such as chemical, thermal, mechanical, or other storage methods to ensure continuous operation.

Among these storage methods, electrochemical batteries are the most prevalent due to their high energy density. However, they are costly and involve the exploitation of materials like lithium, cobalt, and nickel, which have detrimental environmental and societal effects. The manufacturing process for batteries is energy-intensive and generates greenhouse gases and air pollutants. Furthermore, electrochemical batteries have a relatively short lifespan of about 5-7 years and degrade over time, resulting in diminished performance and capacity. Proper disposal of batteries at the end of their life cycle poses significant challenges due to waste management and recycling requirements.

Improper handling of batteries poses environmental risks, as they contain hazardous materials such as heavy metals (e.g., lead, cadmium) and toxic electrolytes. Consequently, the utilization of electrochemical cells in current drying applications is not viable if sustainability and environmental protection are prioritized.

SUMMARY

To address the challenges associated with conventional energy storage methods, the subject matter of this application generally relates to systems and methods for storing energy in the form of heat instead of electricity.

In particular, one innovative aspect of the subject matter described in this specification can be embodied in a thermal storage battery. The thermal storage battery includes a battery core that includes a battery core shell made of stainless steel and a thermal storage material mixture included in the battery core shell, the thermal storage material mixture including a mixture of sand and graphite. The thermal storage battery further includes a plurality of heating elements placed in the battery core. The plurality of heating elements are configured to generate heat from electrical energy, the thermal storage material mixture is configured to store the heat, and each of the plurality of heating elements is surrounded by a respective protective tube; a plurality of wall thermal insulation layers, a lid thermal insulation layer, and a bottom thermal insulation layer that enclose the battery core; and a heat extraction pipe configured to collect heat from the battery core. The battery core, the plurality of heating elements, the plurality of wall thermal insulation layers, the lid thermal insulation layer, the bottom thermal insulation layer, and the heating collection pipe are encased in a steel outer frame. In some implementations, the protective tubes are carbon-based protective tubes made from a mixture of silicon carbide and graphite.

Another innovative aspect of the subject matter described in this specification can be embodied in a thermal storage battery system for drying agricultural products. The thermal battery system includes an input power supply system configured to supply electrical energy to a thermal storage battery, the thermal storage battery, and a drying chamber configured to receive heat from at least one heat extraction pipe of the thermal storage battery for drying agricultural products. The thermal storage battery includes a battery core comprising a battery core shell made of stainless steel and a thermal storage material mixture included in the battery core shell, the thermal storage material mixture including a mixture of sand and graphite. The thermal storage battery further includes a plurality of heating elements placed in the battery core. The plurality of heating elements are configured to generate heat from the electrical energy, the thermal storage material mixture is configured to store the heat, and each of the plurality of heating elements is surrounded by a respective protective tube. The thermal storage battery further includes a plurality of wall thermal insulation layers, a lid thermal insulation layer, and a bottom thermal insulation layer that enclose the battery core. The thermal storage battery further includes at least one heat extraction pipe configured to collect heat stored in the thermal storage material mixture in the battery core. The battery core, the plurality of heating elements, the plurality of wall thermal insulation layers, the lid thermal insulation layer, the bottom thermal insulation layer, and the heating collection pipe are encased in a steel outer frame.

The foregoing and other embodiments can each optionally include one or more of the following features, alone or in combination.

The thermal storage material mixture may include 20% to 50% by weight of graphite over a total weight of the mixture of sand and graphite.

The plurality of heating elements may be installed vertically or horizontally and are evenly distributed in the battery core. The plurality of heating elements may be arranged 100 mm to 400 mm apart.

The plurality of wall thermal insulation layers and the lid thermal insulation layer may be made of the same insulation material.

The insulation material may be one of fiberglass, ceramic wool, vacuum block or other non-combustible material with a thermal conductivity equal to or below a threshold level. The threshold level may be 0.08 W/mK.

If the insulation material is made of ceramic wool, the thickness of the insulation layer may be at least 20 cm.

The at least one heat extraction pipe may be equipped with heat dissipation fins made of stainless steel to increase thermal contact area with the thermal storage material mixture.

The thermal storage battery may further include an inlet isolation valve and an outlet isolation valve arranged at two ends of the at least one heat extraction pipe, wherein each of the inlet isolation valve and the outlet isolation valve is located in one of the pluralities of wall thermal insulation layers.

Each of the inlet isolation valve and the outlet isolation valve may have an input pipe part and an output pipe part, the input pipe part and the output pipe part being isolated from each other by a layer of air and being covered by a block of insulation material.

The thermal storage battery may further include one or more temperature sensors. Each temperature sensor may be located adjacent to at least one of (i) the at least one heat extraction pipe or (ii) the plurality of heating elements.

The one or more temperature sensors may be connected to a controller that may be connected to a fan and an electronic control valve of a thermal storage battery system. The controller may be configured to monitor and manage operations of the thermal storage battery system. The controller may be configured to automatically control charging and discharging processes of the thermal storage battery.

The controller may be configured to automatically select heat extraction from a temperature region having a temperature above a threshold level by activating the opening or closing of an inlet isolation valve at an inlet of the at least one heat extraction pipe. The threshold level depends on a set value of the drying chamber. The set value may be specified by a user. For example, if the user wants to dry Swallow's nest, any region that has higher temperature of 70° C. could be used to extract heat from. At a time instance, the controller may automatically decide which valve is opened to extract heat from.

The input power supply system may be one of (i) a system connected to a grid power source, (ii) a system that is connected to photovoltaic panels for collecting solar energy, or (iii) a system that includes blades and wind turbines for converting wind kinetic energy into electricity.

The at least one heat extraction pipe may be equipped with heat dissipation fins made of stainless steel to increase thermal contact area with the thermal storage material mixture.

The drying chamber may include heat sinks to conduct and distribute the heat within the drying chamber.

The drying chamber may further include a temperature sensor and a humidity sensor.

The temperature sensor and the humidity sensor may be connected to a controller for monitoring and managing operations of the thermal battery system.

The drying chamber can be used for drying agricultural and food products.

The subject matter described in this specification can be implemented in particular embodiments so as to realize one or more of the following advantages.

The thermal storage battery system described herein is a solid material-based energy storage system that provides an inexpensive solution for storing energy from renewable energy sources in comparison to traditional energy storage systems. The described thermal storage battery capitalizes on and stores the surplus heat generated during periods of ample renewable energy supply. The heat stored in the thermal storage battery can be used for various purposes, such as for industrial, commercial, agricultural, or household uses. For example, the described thermal storage battery system can be used in agricultural applications such as drying agricultural and food products. By using the described thermal storage battery system, farmers and other food producers can obtain consistent production of goods with guaranteed productivity and quality. As another example, the described thermal storage battery can be used in systems for heating and supplying hot water to office buildings and households. As another example, the described thermal storage battery can be used in systems for generating steams and electricity.

The described thermal storage battery system provides long-term storage of thermal energy in a storage material, which is then released and utilized as needed without requiring additional power input, ensuring uninterrupted drying operations. The described thermal storage battery system can serve various functions including heating, drying, and generating electricity. During the charging process of the thermal storage battery, the storage material absorbs heat via various heat transfer mechanisms such as conduction, convection, and radiation. Subsequently, this thermal energy is harnessed through natural or forced discharge due to the temperature difference between the storage environment and the desired application.

In some implementations, the thermal storage battery described in this application can be connected to the input power supply system using heat-resistant wires. This module includes one or more heating rods (or heating elements) placed in a solid material to store the heat energy generated. These heating rods have the effect of converting electrical energy into heat energy according to the Joule-Lenz exothermic principle.

Traditional thermal energy storage systems utilize phase change materials such as water, molten salt, and aluminum. The thermal storage battery described in this application uses solid materials as storage mediums to mitigate potential risks associated with the above traditional phase change materials pressure, i.e. the risks of pressure buildup at elevated storage temperatures. Generally, solid materials used for heat storage can be sand, bricks, rocks or other solid materials with high specific heat and melting temperature. However, sand is selected as the main thermal storage material in the thermal storage battery described in this specification due to its good thermal storage ability with high specific heat capacity and melting temperature. In addition, sand is highly favored due to its ubiquity and low-cost, making it convenient for deploying the described thermal battery system in any location. In addition, the thermal storage battery described in this application uses a mixture of sand and graphite as the thermal storage material because the sand-graphite mixture can help the heat transfer rate be much faster than the pure sand material. By including graphite to the mixture, the heat transfer rate can escalate, leading to more uniform heat distribution within the battery. Consequently, this results in reduced charging and discharging times, enhancing the battery's usability.

A heat transferring mechanism transfers heat stored in the thermal storage battery to the drying chamber for drying agricultural products. This mechanism involves one or more heat extraction pipes to transfer the heat-conducting medium (air) from the outside environment through the thermal storage battery to the drying chamber, heating the product inside the drying chamber. The drying chamber is a closed chamber into which the product to be dried is placed, with an insulating layer to reduce heat emission to the outside environment.

The thermal storage battery described in this specification provides many technical advantages over conventional energy storage batteries, including improving energy efficiency, bolstering the stability of renewable energy systems, reducing reliance on weather conditions, optimizing investment costs, and curtailing payback periods. These benefits play a pivotal role in advancing the integration of sustainable renewable energy.

In addition, the thermal storage battery described herein provides numerous other advantages. Given that a significant portion of electricity demand stems from heating, directly storing thermal energy in the described thermal storage battery is an ideal solution for many real-world applications, thereby fostering wider adoption of renewable energy in industrial, agricultural, commercial and household uses. Further, using the thermal storage battery described herein can help to stabilize the power grid. The thermal storage battery also offers lower costs compared to alternative energy storage solutions, while eschewing hazardous materials, thereby minimizing environmental impacts. In addition, the thermal storage battery described herein has a prolonged lifespan, enabling efficient long-term energy storage without significant performance degradation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
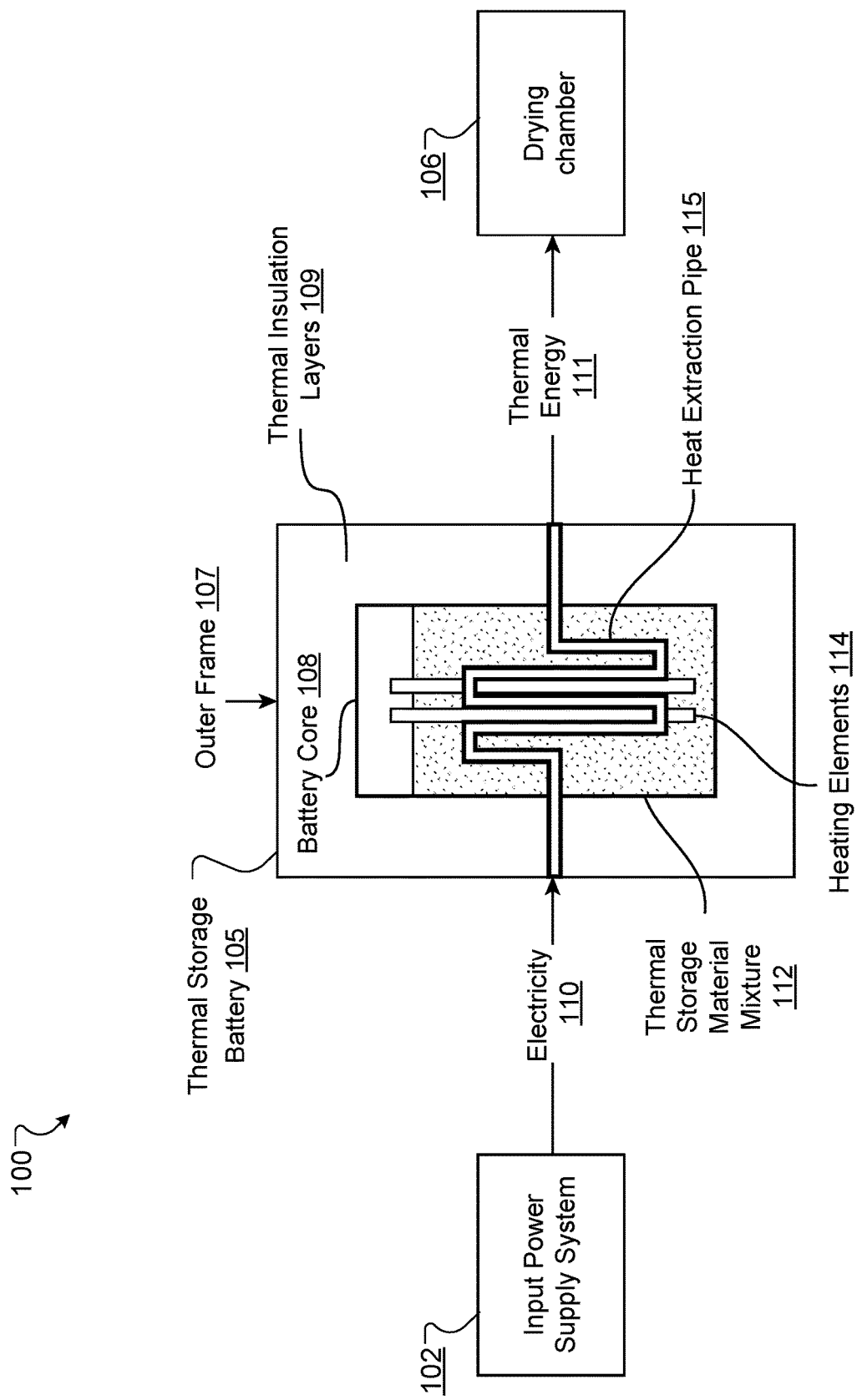
FIG. 1 illustrates the block diagram of an example of a thermal energy storage system.

FIG. 1 illustrate an example of a thermal storage battery system 100. The thermal storage battery system 100 includes an input power supply system 102, a thermal storage battery 105, and a drying chamber 106.

The thermal storage battery system has four main functions: heat generation, heat accumulation, heat extraction, and drying. Generally, the input power supply system 102 generates electricity 110 from renewable sources and uses the electricity 110 to power the thermal storage battery 105. The thermal storage battery 105 converts the electricity (electrical energy) 110 into thermal energy (heat) and store the thermal energy in the battery 105. The thermal storage battery 105 is then configured to transfer the thermal energy 111 to the drying chamber 106 for drying as needed.

Heat Generation

In some implementations, the input power supply system 102 uses photovoltaic panels (not shown) for collecting solar energy and uses the solar energy to generate electricity 110. The input power supply system 102 supplies the electricity 110 to the heating elements 114 located in the battery core 108 of the thermal storage battery 105.

In some other implementations, the input power supply system 102 is a system that includes blades and wind turbines for converting wind kinetic energy into electricity 110. The input power supply system 102 supplies the electricity 110 generated by wind power to the thermal storage battery 105, without changing the structure of any component of the thermal storage battery 105.

In some other implementations, the input power supply system 102 is connected to a grid power source and provides electricity 110 from the grid power source to the thermal storage battery 105.

The thermal storage battery 105 includes (i) a battery core 108 encased in an outer frame 107 and (ii) a plurality of thermal insulation layers 109 between the battery core 108 and the outer frame 107. The plurality of thermal insulation layers 109 prevent heat loss from the battery core 108 to the outside environment. The battery core 108 includes a thermal storage material mixture 112, a plurality of heating elements 114, and at least one heat extraction pipe 115. The structure of the thermal storage battery 105 is described in more detail below with reference to FIG. 2.

During the heat generation process, the heating elements 114 are heated according to the Joule-Lenz exothermic principle. The heating elements 114 are configured to convert electrical energy received from the input power supply system 102 into thermal energy (heat), capable of reaching temperatures of up to 1000° C. This temperature level is a sufficiently high for reserving energy to fulfill the drying process requirements, facilitating drying across a wide range of product types and ensuring moisture reduction to a desired level. The input power capacity may vary depending on specific drying needs. Higher electrical capacity is required for charging the thermal storage battery 105 if the drying process requires elevated drying temperatures, large batch sizes, extended drying durations, continuous drying operations, or shorter charging times.

Figure 3:
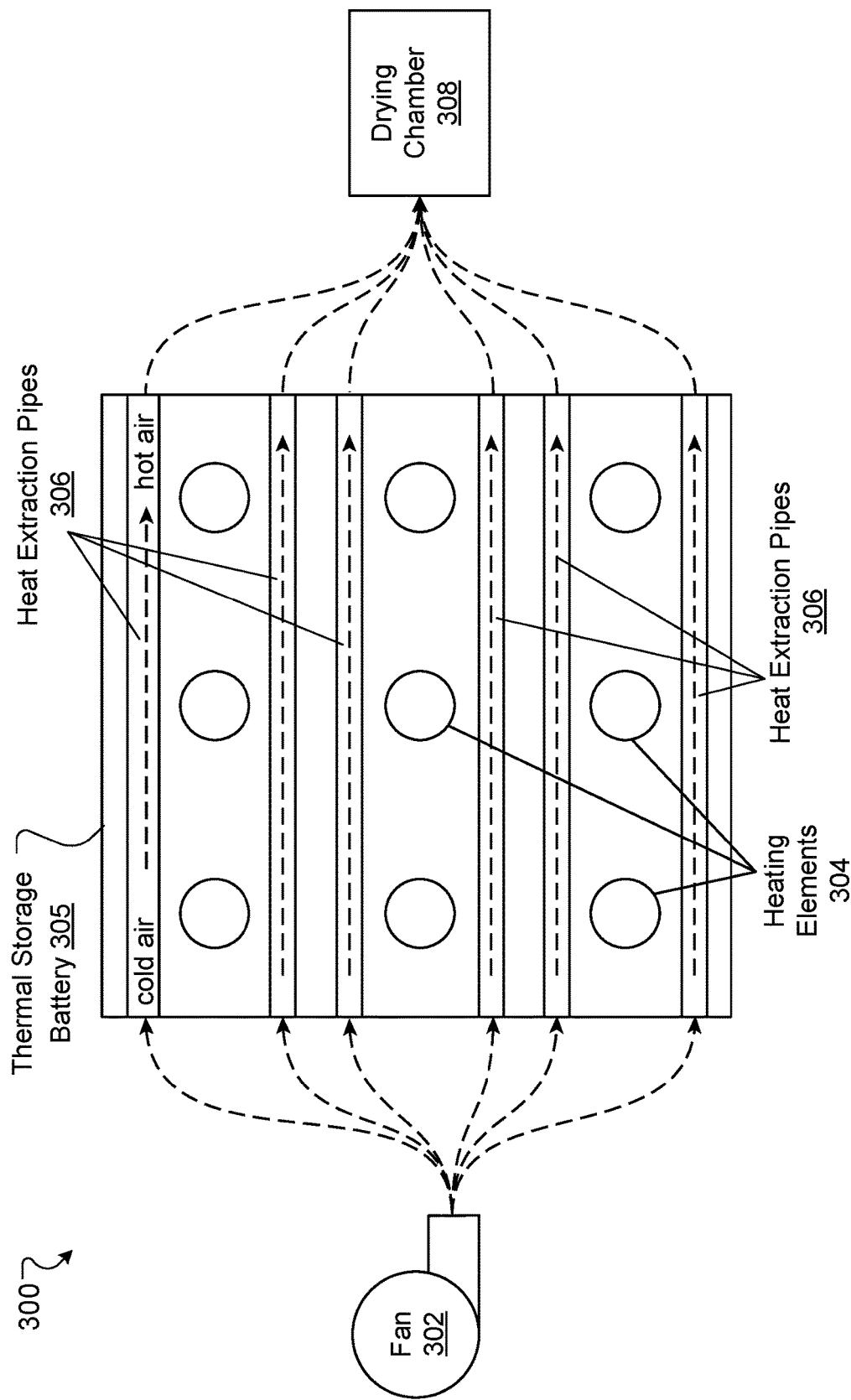
FIG. 3 illustrates an example of a heat extraction system and an example of an arrangement of heating elements in the battery core.

FIG. 3 illustrates an example of an arrangement of a plurality of heating elements in the battery core. As shown in FIG. 3, the heating elements 304 in the thermal storage battery are installed vertically or horizontally, evenly distributed in the battery core to ensure temperature uniformity throughout the battery block horizontally. In some implementations, the length of each of the heating elements 304 is equal to the height of the battery core to ensure vertical temperature uniformity. The diameter of the heating elements can be determined according to the size and capacity of the battery. In some implementations, users may specify the diameter of the heating elements. The material for each heating element may be SiC silicon carbide to ensure that the heating elements can be heated up to high temperatures (>1600° C.) for a long time without being affected by oxidation.

The arrangement of the heating elements 304 in the thermal storage battery system optimizes heat distribution throughout the storage environment. The heating elements 304 can be arranged in rows, in a grid, or in any other way, as long as uniform heat distribution is achieved throughout the thermal storage battery 105. The number of heating elements 304 can be determined based on the size of the battery core 108 and the effective heating radius. For example, with 8 kW heating elements (input voltage 220V), placing two heating elements about 100 mm to 400 mm apart can achieve an acceptable battery charging speed for most applications (depending on the capacity of the heating elements).

Heat Accumulation

Figure 2:
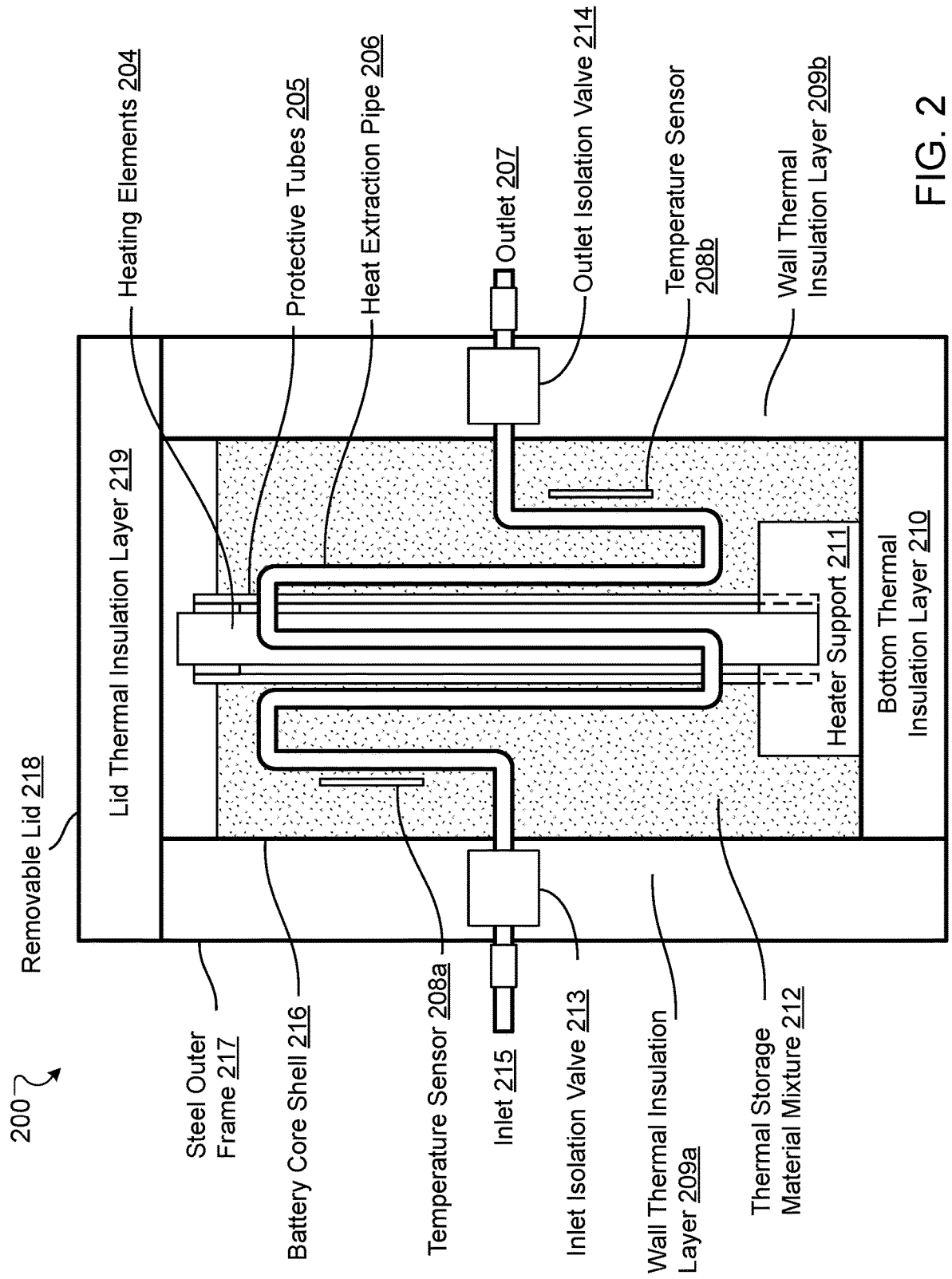
FIG. 2 shows an example structure of a thermal storage battery.

FIG. 2 shows an example structure of a thermal storage battery for accumulating and storing heat. The thermal storage battery 200 includes a battery core that includes a battery core shell 216 and a thermal storage material mixture 212 included in the battery core shell 216. The thermal storage battery 200 further includes a plurality of heating elements 204 placed in the battery core shell 216, a plurality of wall thermal insulation layers 209a and 209b, a lid thermal insulation layer 219, and a bottom thermal insulation layer 210 that enclose the battery core. The battery core, the plurality of heating elements 204, the plurality of wall thermal insulation layers 209a and 209b, the lid thermal insulation layer 219, the bottom thermal insulation layer 210, and the heat extraction pipe 206 are encased in a steel outer frame 217. While FIG. 2 shows one heat extraction pipe 206, in some implementations, the thermal storage battery 200 includes a plurality of heat extraction pipes. For example, FIG. 3 shows multiple heat extraction pipes 306 that are placed between heating elements 304 in a battery core.

The thermal storage material mixture 212 includes a mixture of sand and graphite (also referred to as the "sand-graphite mixture"). The sand-graphite mixture is contained in the battery core shell 216. In some implementations, the battery core shell 216 is made of stainless steel to avoid oxidation when exposed to high temperatures for long periods of time.

The capacity of the thermal storage battery 200 is proportional to the volume of the battery core. The shape of the battery core can be cylindrical, rectangular, cube or any other shape with a sufficiently small surface area to volume ratio. A smaller surface area-to-volume ratio yields higher power density and reduces the need for insulation.

The battery core is designed to ensure energy efficiency over a period of multiple days, so to achieve the required heat loss level, there needs to be a thermal insulation layer between the battery core and the outside environment. The battery core is insulated from the outside environment thanks to the two wall thermal insulation layers 209a and 209b on the battery wall. The top of the thermal storage battery is a removable lid 218 that includes a lid thermal insulation layer 219. The removable lid 218 can be removed for installation and maintenance. The bottom of the battery core is insulated from the environment by a bottom thermal insulation layer 210. The composition of the wall thermal insulation layers 209a and 209b in the battery wall and the lid thermal insulation layer 219 is the same.

The insulation material of the bottom thermal insulation layer 210 must withstand the internal load of the entire battery core (at least 3500 kg/m$^2$). To meet this requirement, the bottom thermal insulation layer 210 may be made of sheet calcium silicate and hard mineral wool.

The thermal insulation layers of the battery core must ensure that heat loss from the battery core to the environment does not exceed 3-5% per day (24 hours).

Insulation materials may be made from fiberglass, ceramic wool, vacuum block or similar non-combustible materials with low thermal conductivity. Low thermal conductivity is considered to be less than or equal to 0.08 W/mK. If an insulation layer is made of ceramic wool, the thickness of the insulation layer should be at least 20 cm.

The entire battery core, the lid thermal insulation layer 219, the wall thermal insulation layers 209a and 209b, and the bottom thermal insulation layer 210 are encased in a sturdy steel outer frame 217 to ensure long-term, sustainable operations.

The battery core includes the plurality of heating elements 204 that are surrounded by a plurality of protective tubes 205. The protective tubes 205 and heating elements 204 are supported by heater supports 211 which provide spaces for wiring and connections of heaters in the battery core, as well as help position the heaters inside the battery core. Heater supports 211 are made from refractory material. Because the heating elements 204 are located inside the protective tubes 205, the heating elements 204 does not contact directly with the thermal storage material mixture 212. Thus, it is simple to install or replace heating elements without dismantling the entire battery.

When a heating element needs to be replaced, it is easy to pull the heating element out of the graphite protective tube and insert a new heating element into the graphite protective tube. In addition, this design not only protects the heating elements 204 but also ensures effective heat transfer from the heating elements 204 to the thermal storage material mixture 112.

Heat is transferred from the heating elements 204 through the protective tubes 205 to the thermal storage material mixture 212 in FIG. 2, primarily through heat radiation and heat conduction. The thermal storage material mixture 212 is characterized by the following properties:
  i. Non-flammable and inert;
  ii. Possesses a high specific heat capacity and a melting temperature exceeding 1400° C. A higher specific heat capacity enables prolonged energy storage, while a higher melting point allows for greater thermal energy retention before melting or performance degradation;
  iii. Generates no harmful gases when heated, at least up to 800° C.;

iv. Possesses sufficient thermal conductivity to ensure that a charging and discharging process is suitable for usage needs, thus preventing significant temperature variations across different regions within the battery; and v. The chosen thermal storage materials must be low-cost and readily available on the market.

The thermal storage material mixture 212 includes a mixture of sand and graphite.

As the graphite content in the mixture increases, the heat transfer rate escalates, leading to more uniform heat distribution within the battery. Consequently, this results in reduced charging and discharging times, enhancing the battery's usability.

Figure 4:
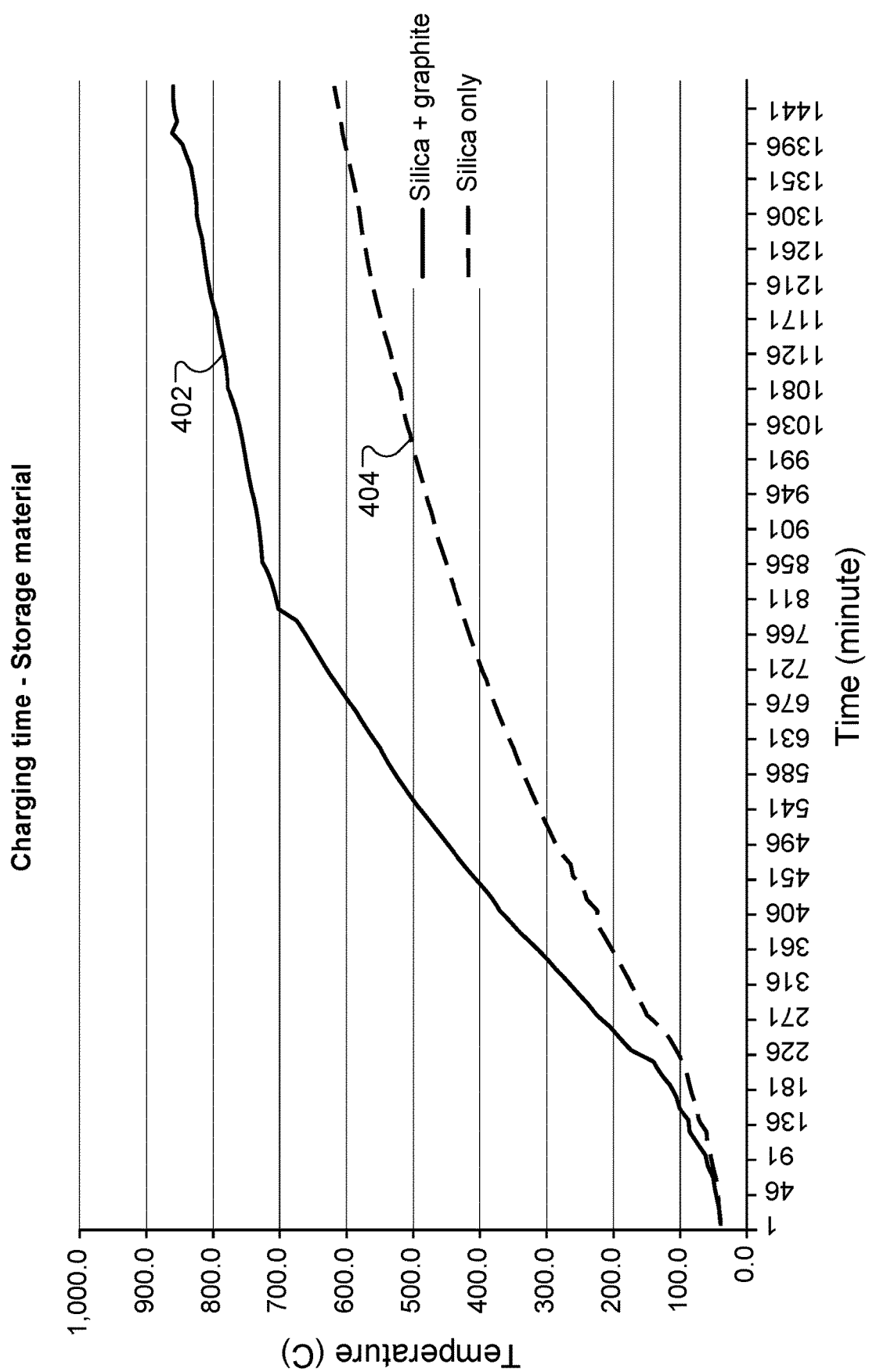
FIG. 4 shows a graph of heating time according to materials in two cases: when only sand is used and when a sand-graphite mixture is used.

FIG. 4 is a graph showing the thermal conductivity of a thermal storage battery in the case of a sand-graphite mixture and the case of only sand without graphite. The sand-graphite mixture can help the heat transfer rate be much faster than the pure sand material (e.g., 50% faster). If the heat storage mixture does not contain graphite, battery usage may be interrupted due to waiting time for heat transfer between areas in the thermal storage battery. The ratio of graphite and sand in the sand-graphite mixture is determined based on the application purpose (or the desired heat transfer rate) and costs. The appropriate ratio of graphite for drying agricultural products is determined to be about 20%-50% of the mixture weight. Increasing the graphite content in the mixture helps to increase the heat transfer rate, but unnecessarily increases the cost of the thermal storage battery.

There are no stringent requirements regarding the quality and type of sand utilized in the battery. Varying the type of sand would have a minimal impact on system performance. Therefore, a wide range of sands, particularly those not typically used for construction, can be employed to minimize costs.

The battery core further includes one or more temperature sensors (e.g., temperature sensors 208a and 208b in FIG. 2). The one or more temperature sensors are evenly distributed in different areas of the thermal storage battery to obtain information about the temperature in each area, thereby controlling the burners accordingly so that the heat is distributed uniformly in the battery. When the temperature of the entire battery core reaches approximately 600° C.-750° C., the heating elements 204 will be deactivated and the thermal storage battery is fully charged.

Heat Extraction

The thermal storage battery system uses a heat extraction system for extracting the heat stored in the thermal storage battery out for use. The heat extraction system must satisfy the following requirements:

i. It prevents direct heat transfer from the interior of the battery to the exterior, minimizing heat loss at both input and output ends;

ii. It ensures that the heat extraction pipe within the thermal storage battery is long enough and has a sufficiently large contact area with the thermal storage material mixture 212 to extract the required amount of heat; and iii. It utilizes materials for the heat extraction pipe that resist oxidation, as they will consistently operate in high-temperature environments.

Figure 5:
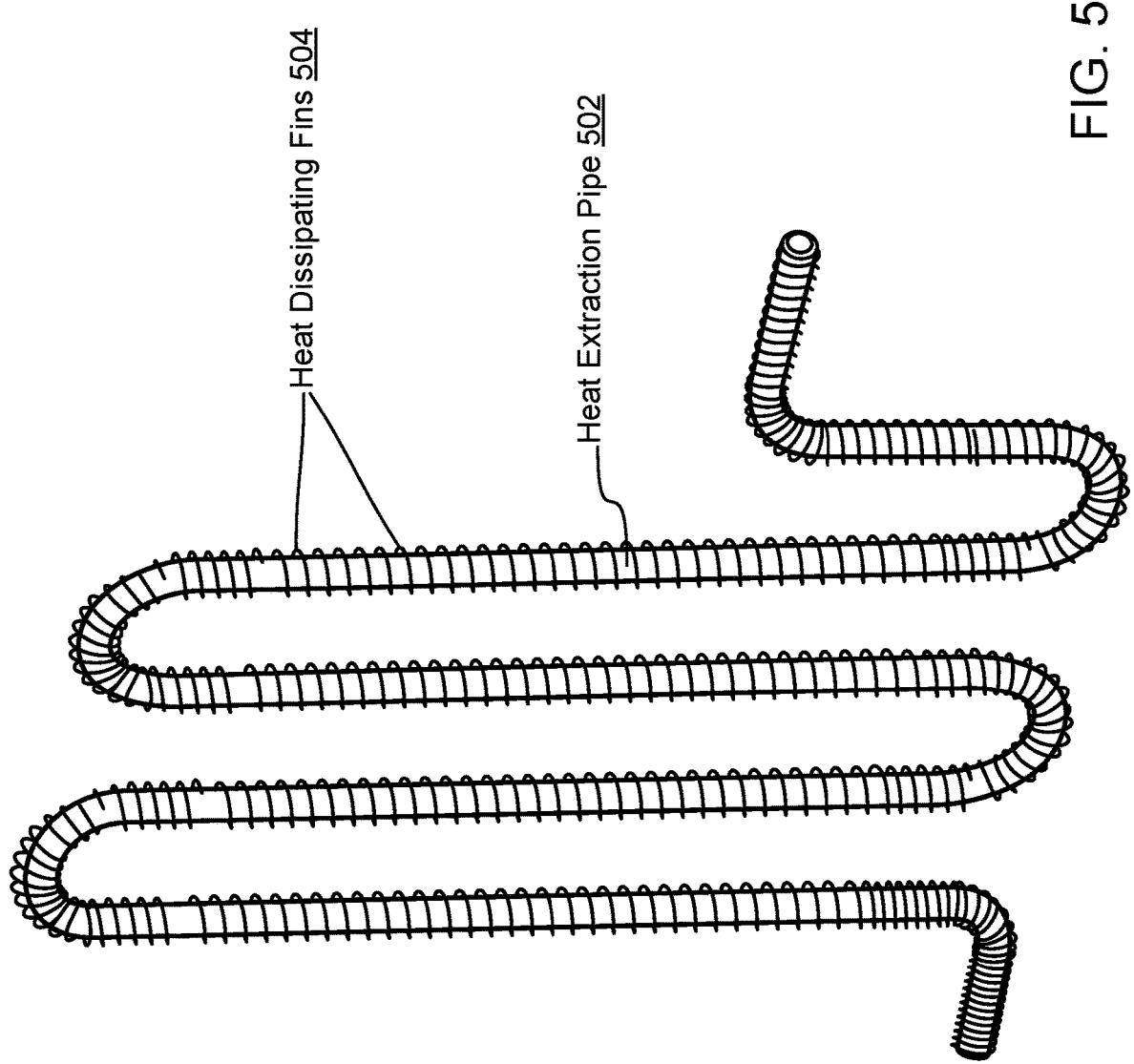
FIG. 5 illustrates an example of a heat extraction pipe placed in a battery core.

FIG. 3 illustrates an example of a heat extraction system 300 that satisfies the above requirements. The heat extraction system 300 includes a fan 302 that is configured to blow a refrigerant (e.g., air or water) from the environment into the thermal storage battery 305 through a heat extraction pipe system. The heat extraction pipe system that carries the refrigerant into the thermal storage battery 305 includes one or more winding heat extraction pipes for transmitting the stored heat from the thermal storage material in the thermal storage battery to the medium (i.e., the refrigerant (air/water) that runs inside the pipes to carry heat from the battery core to the drying chamber or other devices). As illustrated in FIG. 5, each heat extraction pipe 502 is equipped with heat dissipating fins 504 that are made of stainless steel to increase a thermal contact area of the heat extraction pipe 502 with the thermal storage material mixture. As shown in FIG. 3, the high-temperature medium (hot air) is directed out and into the drying chamber 308. The heat extraction pipes are made of stainless steel or copper-aluminum alloy to ensure the ability to operate with high temperature media (e.g., high temperature fluids) for a long time.

As depicted in FIG. 2, the connection between the heat extraction pipe 206 in the battery core and the inlet 215 and outlet 207 that are in contact with the external environment plays a very important role because there is always a very large temperature difference between the battery core and the environment. The connection between the heat extraction pipe 206 and the inlet 215 is called the inlet isolation valve 213. The connection between the heat extraction pipe and the outlet 207 is called the outlet isolation valve 214. Isolation valves are located at both ends of the heat extraction pipe and are located in the wall thermal insulation layer 209a and 209b. Without the special design of the inlet and outlet isolation valves, the heat in the battery core would have been lost through the heat extraction pipe, leading to a requirement of ensuring a low heat loss coefficient that cannot be achieved.

Figure 6:
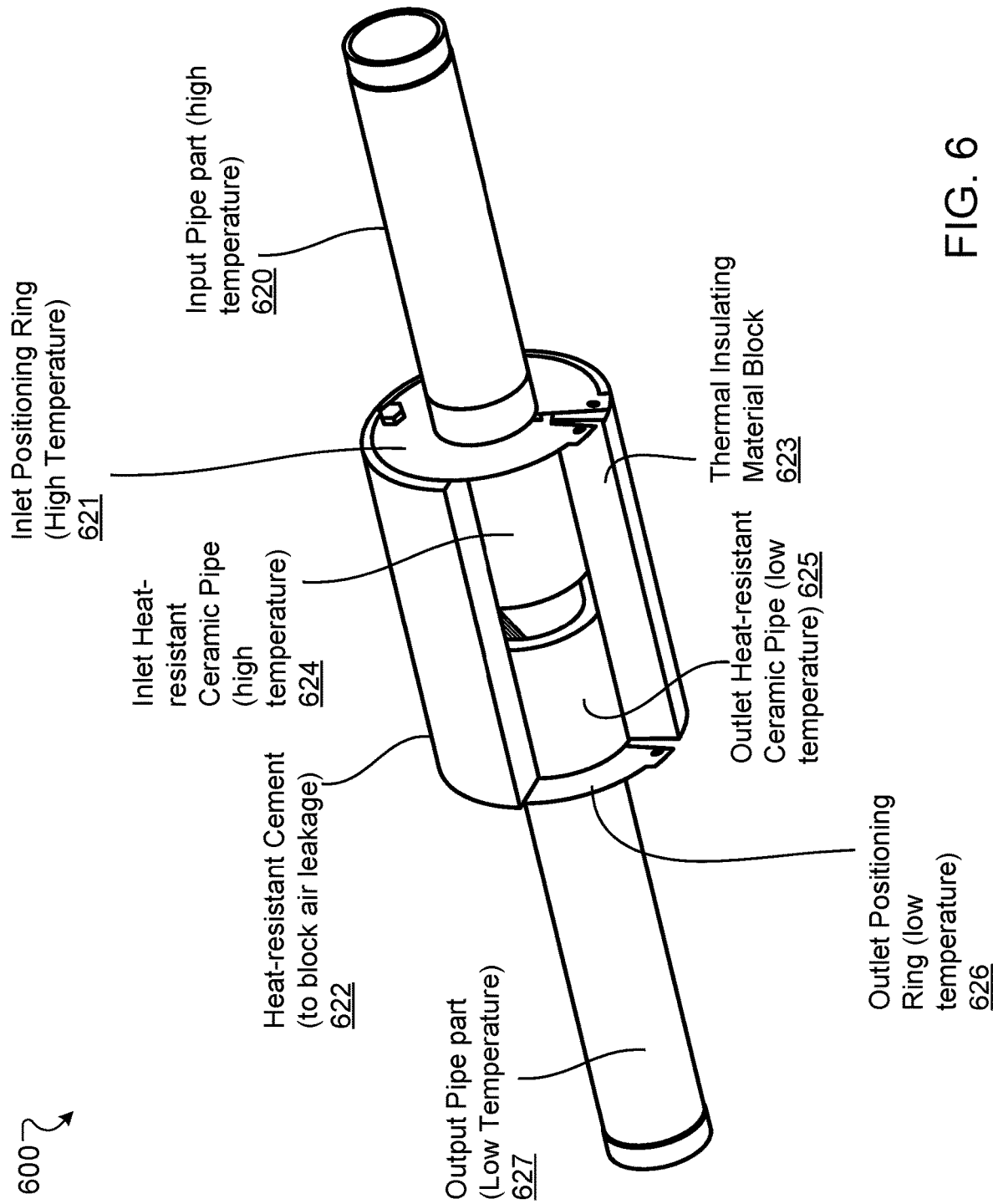
FIG. 6 illustrates an example of an isolation valve structure.

FIG. 6 shows an example structure of an isolation valve 600. The isolation valve 600 includes an input pipe part 620 and the output pipe part 627, which are isolated from each other by a layer of air and are covered with a block of insulation material (e.g., the heat-resistant cement 622). These materials and media all have low thermal conductivity, thus minimizing the possibility of heat loss from the battery core to the environment through the heat extraction system.

The input pipe part 620 and the output pipe part 627 are made of stainless steel. The inlet locating ring 621 and the outlet locating ring 626 are also made of stainless steel. The inlet locating ring 621 and the outlet locating ring 626 allow the thermal insulating material block 623 to be positioned at a proper place between the output pipe part 627 and the input pipe part 620. The two input and output pipe parts are linked together by a heat-resistant, thermal insulating material block 623. The material block 623 is made of a material mixture including aluminum oxide ($Al_2O_3$) and sand. The aluminum oxide accounts for about 40% to 80% of the mixture weight. The material block 623 has a thermal conductivity less than 0.3 W/mK (at 60° C.) and a density less than 0.55 g/cm$^3$. The material block 623 is made in a foam form to reduce thermal conductivity.

The surface of the foam thermal insulating material block 623 is coated with a layer of heat-resistant cement 622 to limit air leakage through porous gaps on the material block 623. The thermal insulating material block 623 covers (i) an inlet heat-resistant ceramic pipe 624 which is a pipe part near the inlet that is made of a special heat-resistant material and (ii) an outlet heat-resistant ceramic pipe 625 which is a pipe part near the outlet that is made of the same special heat-resistant material. More particularly, the inlet heat-resistant ceramic pipe 624 and the outlet heat-resistant ceramic pipe 625 are made primarily from mineral rock that mainly contains aluminum oxide with high heat resistance and low thermal expansion.

Figure 7:
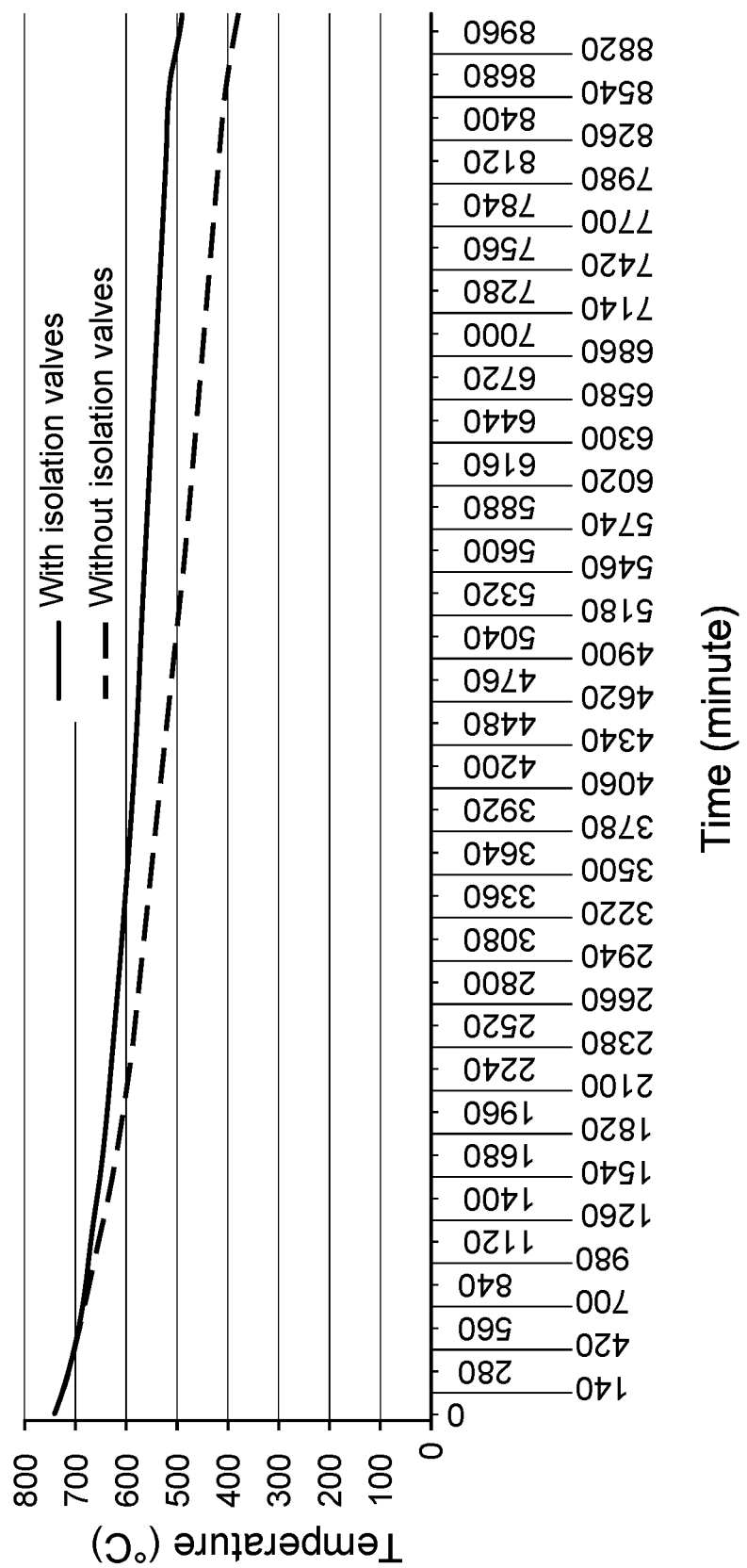
FIG. 7 is a graph that shows the heat loss in two cases: when isolation valves are used and when isolation valves are not used.

FIG. 7 is a graph that shows the heat loss in two cases: when isolation valves are used and when isolation valves are not used. The heat loss at the inlet and outlet of the heat extraction pipe is larger when the isolation valves are not used. Thus, using isolation valves as described in this specification provides a significant technical improvement over existing thermal storage batteries as the valves can help to significantly reduce the heat loss, improving efficiency of the thermal storage battery.

Figure 8:
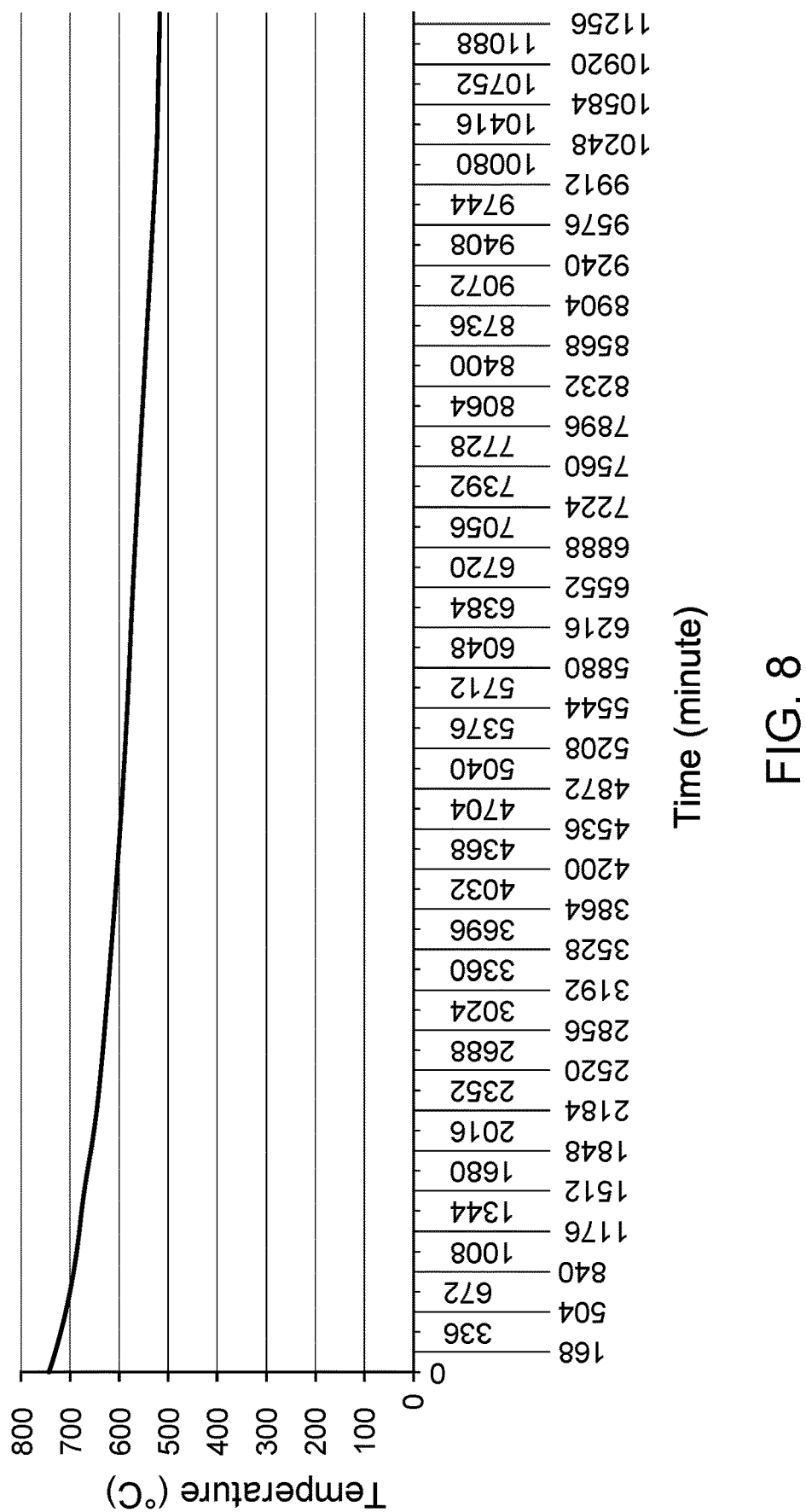
FIG. 8 is a graph showing an average temperature of the battery core in standby mode and heat loss over time when both isolation valves and insulation methods are used

FIG. 8 is a graph that shows the heat loss when both isolation valves and the above-described insulation methods (e.g., using insulation materials) are used. In this case, the thermal storage battery system can achieve a low heat loss rate of less than 3% to 5% per day (24 hours).

Returning to FIG. 3, to begin the heat dissipation process, the heat extraction system 300 uses the fan 302 to blow refrigerant (e.g., air) into the system through an inlet located on the outside of the battery. The fan 302 is programmed to automatically adjust the air flow to suit the heating requirements in the drying chamber 308. The medium temperature at the outlet of the heat extraction system can reach 250° C.-300° C., depending on the temperature in the battery core.

Due to the constraints of the heat transfer rate of the heat storage material, temperature variations exist across different sections of the battery core during the heat extraction process. To address this, heat extraction pipes are evenly distributed throughout the battery core, allowing each pipe to operate independently. For instance, if the temperature in a particular area decreases while heat has not yet reached it, a battery controller can automatically redirect heat from another area with higher temperature to balance the distribution. This cycle continues until uniform temperature is achieved across all areas of the battery.

The heating area selection is fully automated, facilitated by temperature sensors (such as temperature sensors 208a and 208b in FIG. 2) positioned at various locations within the battery core. An optimal heating area selection algorithm is employed to regulate the activation of the inlet isolation valve for each heat extraction pipe.

Drying Chamber

Figure 9:
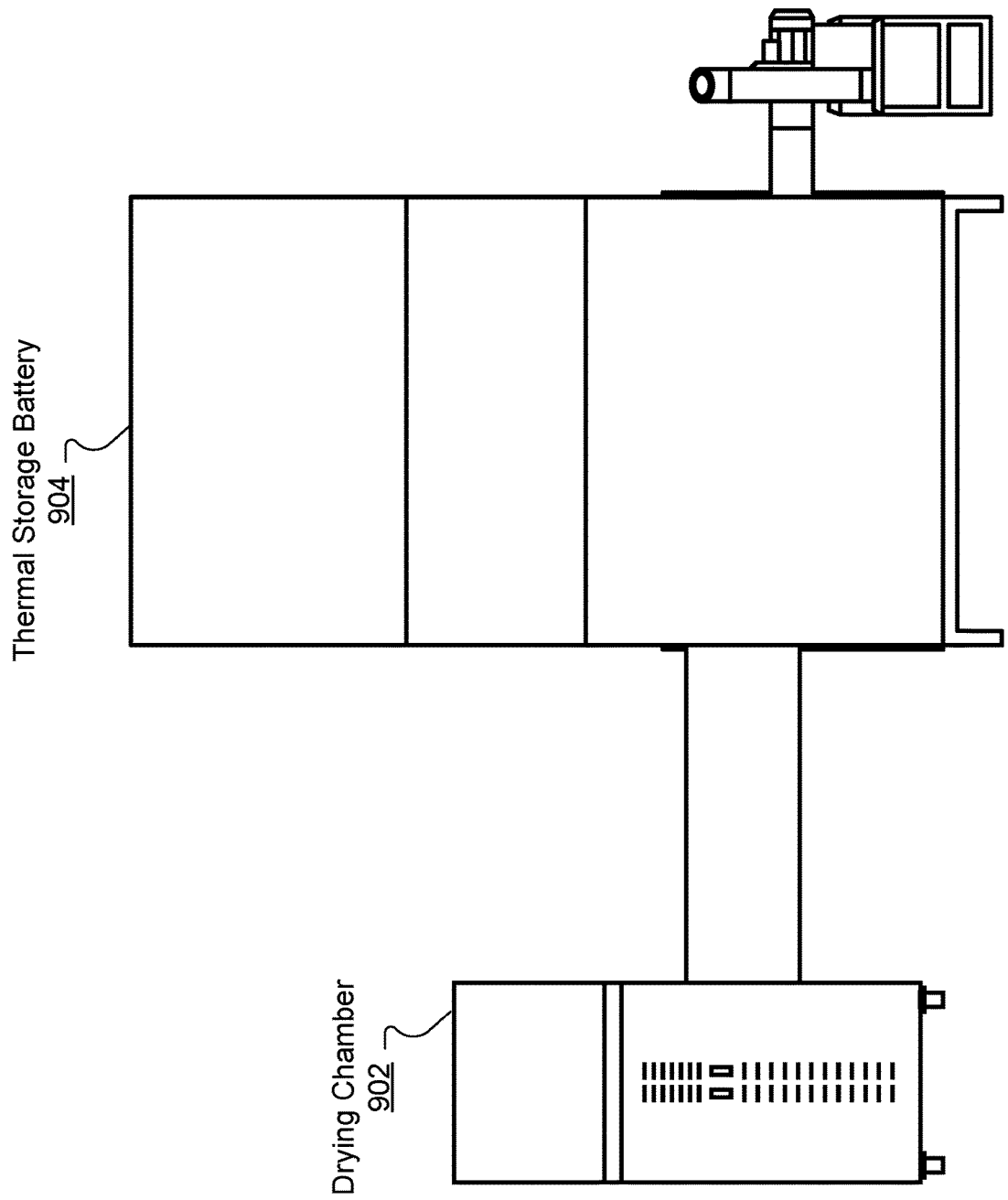
FIG. 9 shows a example of a drying chamber connected to a thermal storage battery.

As depicted in FIG. 9, the drying chamber 902 is linked to the thermal storage battery by pipes, facilitating the transfer of heat from the battery core for use in the product drying process. These connecting pipes must be insulated to minimize heat loss. Common materials for heat retention wrapping include glass wool or ceramic wool.

Figure 10:
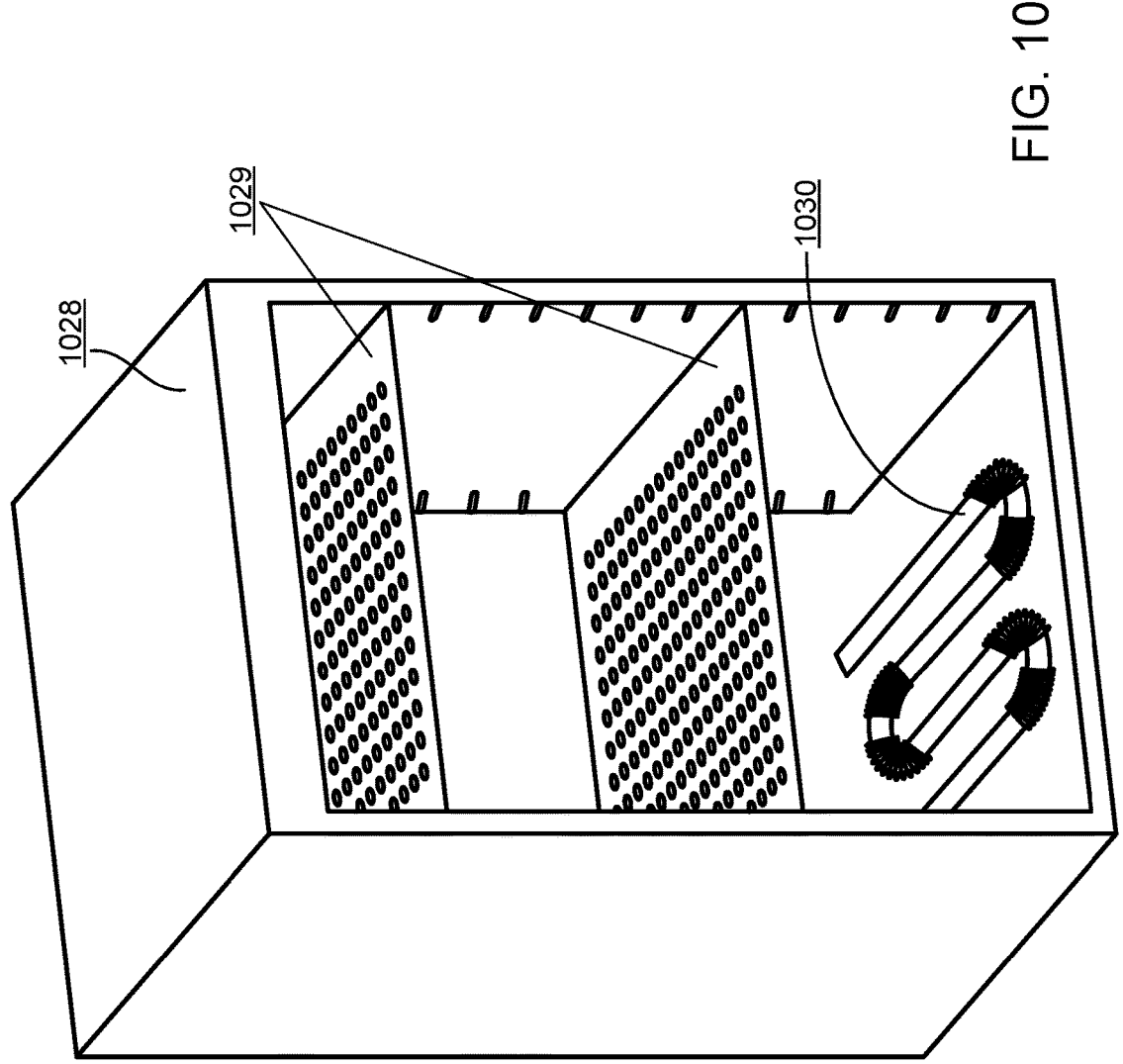
FIG. 10 shows an example structure of a drying chamber.

FIG. 10 illustrates an example of a drying chamber 1000. The drying chamber 1000 is equipped with drying trays 1029 designed to accommodate various agricultural products such as coffee, tea, rice, mangoes, and crickets. The drying trays 1029 ensure proper arrangement and placement of the products for effective drying.

Key requirements for the drying chamber include:
i. Constructing the chamber with stainless steel, with or without insulation between the interior (holding the products) and the shell (in direct contact with the environment).
ii. Installing heat pipes 1030 within the chamber to facilitate efficient and uniform heat conduction and distribution from the hot air stream to the chamber's interior. Compared to traditional dryers, heat pipes offer superior performance by directly applying heat to the objects being dried, reducing losses associated with air that doesn't come into contact with the products.
iii. Incorporating temperature and humidity sensors within the drying chamber to regulate the drying process according to the specific requirements of different product types.
iv. Utilizing stainless steel for the construction of the drying trays 1029 on which the dried products are placed.

In order to achieve consistent heat distribution within the drying chamber, fans may be employed to enhance air circulation and promote uniform drying of agricultural products.

Temperature sensors (not depicted) are strategically positioned within the drying chamber to enable continuous monitoring and regulation of the temperature levels. These sensors offer real-time temperature data, facilitating precise control and adjustment of the drying process.

To manage the steam generated during drying, the drying chamber may be equipped with vents that are designed to expel excess moisture, preventing undesired condensation and maintaining optimal drying conditions.

Internet of Things (IoT) Temperature Monitoring and Control System

As described above, the thermal storage battery integrates multiple temperature sensors positioned at various locations to monitor temperature, thereby facilitating operational control of the battery. Each heating element and heat extraction pipe within the battery core is equipped with a K-type sensor to monitor temperature in specific areas. Furthermore, temperature and humidity sensors in the drying chamber assist in regulating the drying process.

These sensors, along with the fan and electronic control valves are linked to a controller housed in a control box. Serving as the central monitoring and management hub for the entire thermal storage battery system, including the heat extraction system, the controller autonomously oversees the charging and discharging processes without requiring human intervention. In particular, as described above, there are multiple heat extraction pipes inside the battery core. Each heat extraction pipe has a corresponding valve at the inlet of the pipe. By controlling the open or close status of the valve, the controller can enable or disable the air flow through each valve. By that way, the controller can control to extract heat from any desired part of the battery, thereby controlling the discharging process of the battery.

For user convenience, the control box features a touch screen control panel, providing access to monitoring and control functionalities.

The control panel on the control box offers monitoring and control capabilities. Users can monitor the temperature of each heating zone and manually regulate charge/discharge operations in each heating zone.

Figure 11:
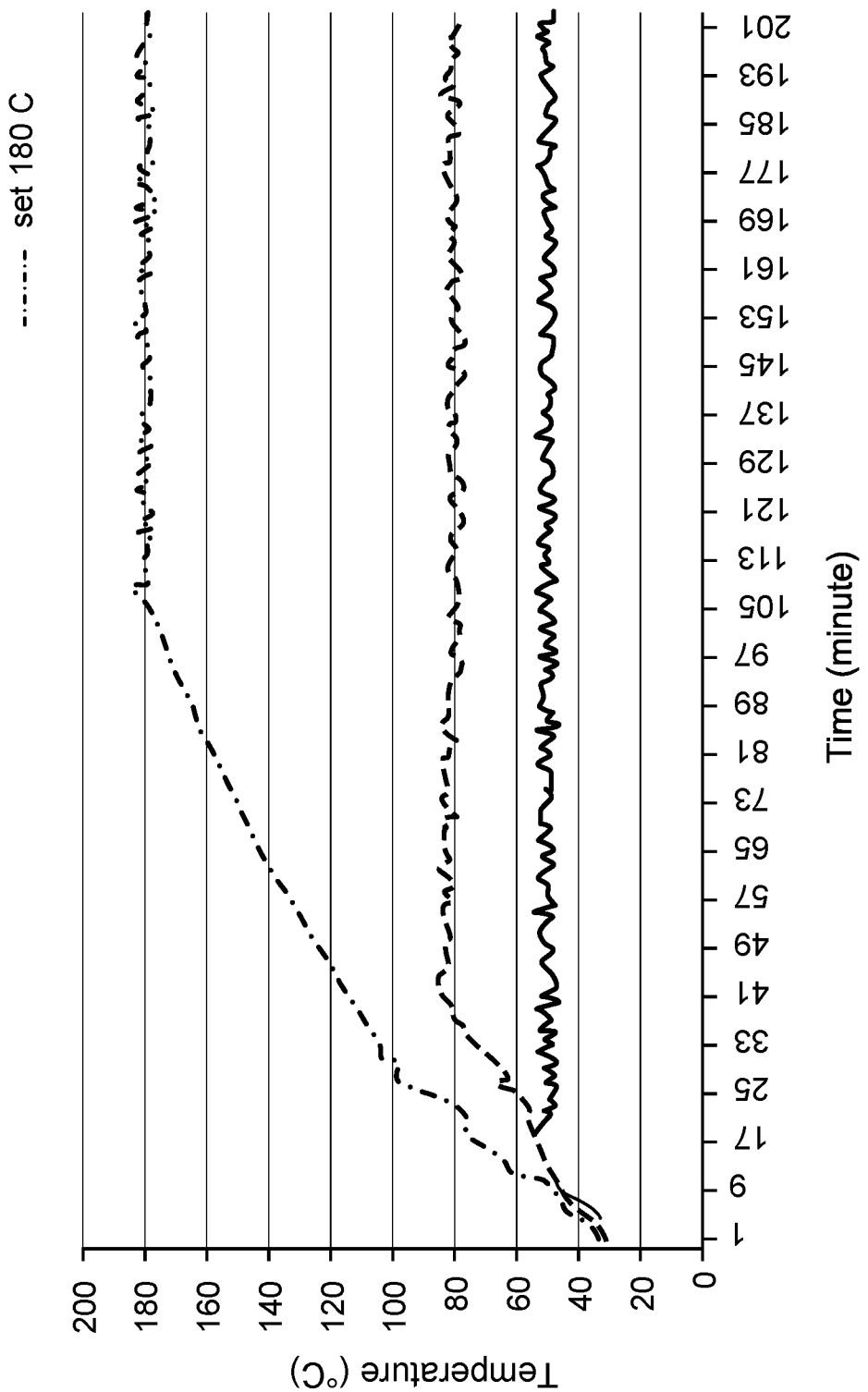
FIG. 11 is a graph showing drying chamber temperatures over time when different target temperatures are set.

FIG. 11 illustrates the temperature trends of the drying chamber over time for various target temperature settings. As shown in the graph, the system's controlled temperature range adequately fulfills the heat demands for the majority of drying applications available in the market.

In addition, the controller has the capability to transmit real-time data to a server, utilizing methods such as a 4G connection. This feature enables data collection for further processing, such as by an artificial intelligence model, aimed at optimizing system performance While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially be claimed as such, one or more features from a claimed combination can in some cases be excised from the combination, and the claimed combination may be directed to a sub combination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. Moreover, the separation of various system modules and components in the embodiments described above should not be understood as requiring such separation in all embodiments, and it should be understood that the described systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A thermal storage battery comprising:
   a battery core comprising a battery core shell made of stainless steel and a thermal storage material mixture included in the battery core shell, the thermal storage material mixture comprising a mixture of sand and graphite;
   a plurality of heating elements placed in the battery core, wherein the plurality of heating elements are configured to generate heat from electrical energy, wherein the thermal storage material mixture is configured to store the heat, and wherein each of the plurality of heating elements is surrounded by a respective protective tube;
   two vertical wall thermal insulation layers, a lid thermal insulation layer, and a bottom thermal insulation layer that enclose the battery core;
   at least one heat extraction pipe configured to collect the heat stored in the thermal storage material mixture in the battery core; and
   an inlet isolation valve and an outlet isolation valve arranged at two ends of the at least one heat extraction pipe, wherein each end of the at least one heat extraction pipe has a respective input pipe part and a respective output pipe part,
   wherein the inlet isolation valve is located in one of two vertical wall thermal insulation layers and the outlet isolation valve is located in the other one of the two vertical wall thermal insulation layers,
   wherein each of the inlet isolation valve and the outlet isolation valve includes: an inlet heat-resistant ceramic pipe coupled to a respective input pipe part, and an outlet heat-resistant ceramic pipe coupled to a respective output pipe part, the inlet heat-resistant ceramic pipe and the outlet heat-resistant ceramic pipe being isolated from each other by a layer of air and being covered by a block of insulation material made of at least aluminum oxide and sand,
   wherein the layer of air and the block of insulation material minimize thermal conduction between the respective input pipe part and the respective output pipe part, thereby prevent heat loss from the battery core to an environment through the at least one heat extraction pipe, and
   wherein the battery core, the plurality of heating elements, the two vertical wall thermal insulation layers, the lid thermal insulation layer, the bottom thermal insulation layer, and the at least one heat extraction pipe are encased in a steel outer frame.

2. The thermal storage battery of claim 1, wherein the thermal storage material mixture comprises 20% to 50% by weight of graphite over a total weight of the mixture of sand and graphite.

3. The thermal storage battery of claim 1, wherein the plurality of heating elements are installed vertically or horizontally and are evenly distributed in the battery core.

4. The thermal storage battery of claim 1, wherein the plurality of heating elements are arranged 100 mm to 400 mm apart.

5. The thermal storage battery of claim 1, wherein the plurality of wall thermal insulation layers and the lid thermal insulation layer are made of a same insulation material.

6. The thermal storage battery of claim 5, wherein the insulation material is one of fiberglass, vacuum block or other non-combustible material with a thermal conductivity equal to or below a threshold level.

7. The thermal storage battery of claim 6, wherein the threshold level is 0.08 W/mK.

8. The thermal storage battery of claim 5, wherein the insulation material is made of ceramic wool, and the thickness of the insulation layer is at least 20 cm.

9. The thermal storage battery of claim 1, wherein the at least one heat extraction pipe is equipped with heat dissipation fins made of stainless steel to increase a thermal contact area with the thermal storage material mixture.

10. The thermal storage battery of claim 1, further comprising one or more temperature sensors, wherein each temperature sensor is located adjacent to at least one of (i) the at least one heat extraction pipe or (ii) the plurality of heating elements.

11. The thermal storage battery of claim 10, wherein the one or more temperature sensors are connected to a controller, wherein the controller is configured to automatically control charging and discharging processes of the thermal storage battery.

12. The thermal storage battery of claim 11, wherein the controller is configured to automatically select heat extraction from a temperature region having a temperature above a threshold level by activating an opening or closing of an inlet isolation valve at an inlet of the at least one heat extraction pipe.

13. The thermal storage battery of claim 1, wherein the block of insulation material is coated with a layer of heat-resistant cement to limit air leakage through porous gaps on the block.

14. The thermal storage battery of claim 1, wherein the block of insulation material has a thermal conductivity less than a threshold number.

15. A thermal storage battery system for drying agricultural products, the thermal storage battery system comprising:
   an input power supply system configured to supply electrical energy to a thermal storage battery;

the thermal storage battery comprising:
- a battery core comprising a battery core shell made of stainless steel and a thermal storage material mixture included in the battery core shell, the thermal storage material mixture comprising a mixture of sand and graphite;
- a plurality of heating elements placed in the battery core, wherein the plurality of heating elements are configured to generate heat from the electrical energy, wherein the thermal storage material mixture is configured to store the heat, and wherein each of the plurality of heating elements is surrounded by a respective protective tube;
- two vertical wall thermal insulation layers, a lid thermal insulation layer, and a bottom thermal insulation layer that enclose the battery core;
- at least one heat extraction pipe configured to collect the heat stored in the thermal storage material mixture in the battery core; and
- an inlet isolation valve and an outlet isolation valve arranged at two ends of the at least one heat extraction pipe, wherein each end of the at least one heat extraction pipe has a respective input pipe part and a respective output pipe part,
- wherein the inlet isolation valve is located in one of two vertical wall thermal insulation layers and the outlet isolation valve is located in the other one of the two vertical wall thermal insulation layers,
- wherein each of the inlet isolation valve and the outlet isolation valve includes: an inlet heat-resistant ceramic pipe coupled to a respective input pipe part, and an outlet heat-resistant ceramic pipe coupled to a respective output pipe part, the inlet heat-resistant ceramic pipe and the outlet heat-resistant ceramic pipe being isolated from each other by a layer of air and being covered by a block of insulation material made of at least aluminum oxide and sand,
- wherein the layer of air and the block of insulation material minimize thermal conduction between the respective input pipe part and the respective output pipe part, thereby prevent heat loss from the battery core to an environment through the at least one heat extraction pipe, and
- wherein the battery core, the plurality of heating elements, the two vertical wall thermal insulation layers, the lid thermal insulation layer, the bottom thermal insulation layer, and the at least one heat extraction pipe are encased in a steel outer frame; and
- a drying chamber configured to receive heat from the at least one heat extraction pipe for drying agricultural products.

16. The thermal storage battery system of claim 15, wherein the input power supply system is one of (i) a system connected to a grid power source, (ii) a system that is connected to photovoltaic panels for collecting solar energy, or (iii) a system that includes blades and wind turbines for converting wind kinetic energy into electricity.

17. The thermal storage battery system of claim 15, wherein the at least one heat extraction pipe is equipped with heat dissipation fins made of stainless steel to increase a thermal contact area with the thermal storage material mixture.

18. The thermal storage battery system of claim 15, wherein the drying chamber includes heat sinks to conduct and distribute the heat within the drying chamber.

19. The thermal storage battery system of claim 15, wherein the drying chamber further includes a temperature sensor and a humidity sensor.

20. The thermal storage battery system of claim 19, wherein the temperature sensor and the humidity sensor are connected to a controller for monitoring and managing operations of the thermal storage battery system.

* * * * *

UNITED STATES PATENT AND TRADEMARK OFFICE
CERTIFICATE OF CORRECTION

PATENT NO. : 12,130,086 B1  
APPLICATION NO. : 18/623773  
DATED : October 29, 2024  
INVENTOR(S) : Nam Quoc Nguyen et al.

Page 1 of 1

It is certified that error appears in the above-identified patent and that said Letters Patent is hereby corrected as shown below:

On the Title Page

Column 1, below "(22) Filed: Apr. 1, 2024" insert therefore -- (30) Foreign Application Priority Data
Aug. 15, 2023 (VN) ........................ 1-2023-05430 --.

Signed and Sealed this
Twenty-sixth Day of November, 2024

Katherine Kelly Vidal
*Director of the United States Patent and Trademark Office*